Aug. 7, 1945.   N. B. WILSON   2,381,196
CENTRIFUGAL CLUTCH
Filed Feb. 25, 1943

Inventor
N. B. Wilson
by Frederick C. Bromley
Atty

Patented Aug. 7, 1945

2,381,196

UNITED STATES PATENT OFFICE 2,381,196

CENTRIFUGAL CLUTCH

Norman Bruce Wilson, Toronto, Ontario, Canada

Application February 25, 1943, Serial No. 477,025

8 Claims. (Cl. 192—107)

My invention relates to improvements in centrifugal clutches in which the friction drive between the driving and the driven member is established by a centrifugal device composed of a series of centrifugally actuated shoes in the nature of weights circularly arranged and supplied with interconnecting means to synchronise their radial movements. In the type of clutch to which I have particular reference the driven member is in the form of a drum which is engaged by friction faces provided on the shoes as by friction linings. The driving member has a disc supplied with dogs fitted between adjacent shoes to cause them to rotate.

A clutch of the kind referred to is disclosed in my co-pending application Serial Number 332,917, filed May 2, 1940, now Patent No. 2,317,573, of which the instant application is a continuation in part.

In said co-pending application there is set out a construction in which the shoes are cast of soft metal with reinforcing means moldably applied to constitute wear faces for engaging the dogs so as to increase the efficiency of the shoes and to prolong their life. In practice it has been found expedient to reinforce the shoes with a relatively hard metal at the places where contact is made with the dogs for the reason that the soft metal of which the body of a shoe is composed will not withstand the wear and tear satisfactorily.

My present improvement comprehends the provision of a reinforcing structure having in combination means to synchronise radial movement of adjacent shoes. The means for causing adjacent shoes to operate in unison is fashioned as a unitary part of the wear-resisting piece of the shoe. The wear-resisting piece is desirably a metal stamping of mild steel having a bearing face for engaging a face of the adjacent dog and having an element projecting from a side of the shoe for interfitting with an adjacent shoe. The wear-resisting piece has the projecting element desirably formed as a struck-up part, but not necessarily so since it might be otherwise devised. It is however slidable in the adjacent shoe for which purpose some form of aperture is supplied therein. The aperture itself may be reinforced to resist wear as by an element struck up from a wear-resisting piece. By this arrangement male and female parts are furnished at opposite sides of a shoe as unitary parts of the reinforcing means and serve to interconnect adjacent shoes.

A shoe may be reinforced by separate wear plates at the sides, in this case one of the plates would carry the male part of the interconnecting means and the other would carry the female part thereof. On the other hand, a shoe may be reinforced by a single wear plate extending from one side to the other so as to present wear-resisting surfaces to the adjacent driving dogs between which it is located. In this case, the male part of the synchronizing means would be so located on the single plate as to project from a side of the shoe at a point inwardly of the driving dog between this shoe and its neighbor.

A salient feature of the invention is that the integral construction of the synchronizing means with the wear-resisting members reduces the cost of manufacture of the shoe and at the same time produces a more efficient structure.

The invention is illustrated in the accompanying drawing in which Fig. 1 is a longitudinal section of the clutch taken on line 1—1 of Fig. 2.

Fig. 6 is a further fragmentary section of the clutch illustrating another modification of the invention in which the wear-resisting member is a band or shroud having a rigid pin at one side and a hole at the other side to form the integrated synchronizing means for neighboring shoes.

Like numerals of reference indicate corresponding parts in each of the figures throughout the drawing of the invention.

Figure 1:
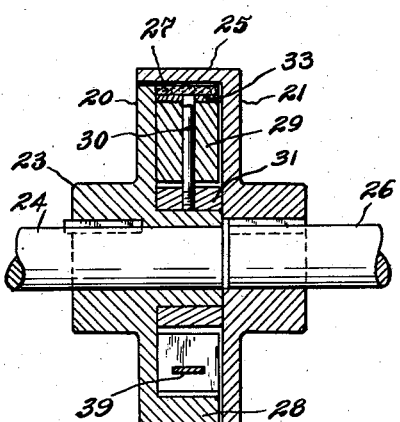

Referring to the drawing, it will be seen that the invention is illustrated in relation to a friction clutch comprising a driving member 20, a driven member 21 and a centrifugal device 22 in the form of an annulus of centrifugally actuated shoes whose centre is concentric with the axis of rotation. As best discernible in Figs. 1 and 2, the driving member is formed as a disc supplied with a hub 23 keyed to a shaft 24 by which power is transmitted. The driven member 21 has an annular flange 25 sleeved over the disc of the driving member and furnished with an internal clutch face. Power is taken off the driven member as by the shaft 26 on which its hub portion is secured. The complement of shoes is essentially in the form of weights which urge a friction element or elements into engagement with the internal face of the drum. It is, however, customary to provide friction elements consisting of loose segments of brake lining 27 positioned between adjacent dogs 28 on the driving member.

Figure 2:
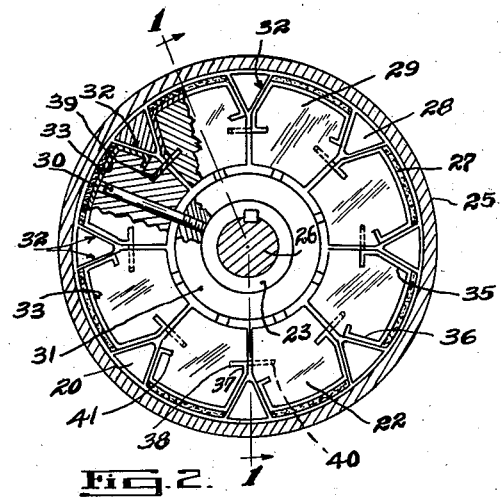
Fig. 2 is an outside face view, partly in section, of the driving member, the drum of the driven member being shown in section.

The shoes 29, as shown in Figs. 1 and 2, may be guided by radial rods 30 rigid with a collar 31, but this is a known structure that is not essential although it does assure of a smoother action. Ordinarily, the shoes are cast of soft metal, such as a lead alloy, as by means of a die casting process. Since considerable wear takes place on the shoe-faces which bear against the side faces 32 of the dogs 28, I have found it necessary to provide a wear-resisting face on the shoes of relatively hard metal at each bearing area. A reinforcement of this nature is disclosed in my patent above referred to.

According to my present invention, I integrate the reinforcement structure with means to provide an interfitting connection between adjacent shoes so as to dispense with extraneous devices for synchronizing their radial movements.

Figure 3:
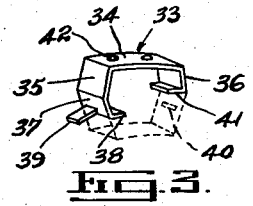
Fig. 3 is a perspective view of the wear-resisting member forming a part of the shoes of Figs. 1 and 2. In this view, the shoe is outlined in dash lines.

Referring to Figs. 1, 2 and 3, the combination reinforcement structure may take the form of a plate 33 moldably embedded in a shoe. The plate is a mild steel member having a medial part 34 curved in conformity with the upper edge of the shoe and having its outer face flush therewith. The plate has bent end parts 35 and 36 which provide wear-resisting faces at the top angular edges of the shoe for engaging faces 32 of the driving dogs. Part 35 is continued downwardly as at 37 along the side of the shoe and is bent inwardly as at 38 so as to produce anchoring elements which secure the plate in the soft metal body. The section 37 is formed with a struck-up lug 39 which projects outwardly from the side of the shoe and fits slidably in an aperture 40 of its neighbor to cause the adjacent shoes to move radially in unison and thus synchronize their movements. Parts 36 may have an inturned anchoring element 41 spaced from aperture 40 in the side of the shoe. Part 34 may be perforated as at 42 to aid in anchoring the plate in the casting operation.

This construction results in a one-piece reinforcing plate which can be manufactured as a metal stamping, and which provides wear-resisting areas for engagement with respective dogs and also an integral interfitting connection for synchronizing radial movements of the shoes.

Figure 4:
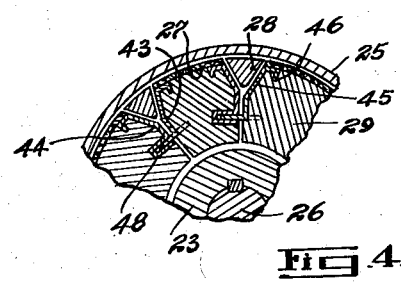
Fig. 4 is a fragmentary section of the clutch showing a modification of the reinforcement in which a pair of wear-resisting plates are employed, one of which is fashioned with a male part of the interconnecting means for adjacent shoes, and the other of which is fashioned with the female part thereof.
Figure 5:
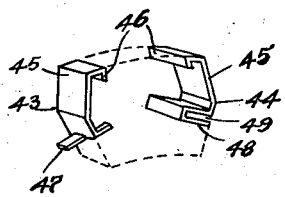
Fig. 5 is a perspective aspect of the reinforcement depicted in Fig. 4, delineating the shoe in dash lines.

In the variant form of the invention shown in Figs. 4 and 5 the reinforcing means consist of a pair of plates 43 and 44, one of which is moldably embedded in the shoe at each upper edge portion thereof with the outer face flush. The plates are substantially C-shaped members having parts 45 providing wear-resisting faces, and having anchoring elements 46 provided by the inturned ends. Plate 43 is fashioned with a lug 47 similar to lug 39 and for the same purpose. Plate 44, however, is fashioned with an inwardly extending U-shaped part 48 which furnishes a reinforced aperture 49 receptive to the lug 47 of the adjacent shoe. The reinforcement of the aperture in the side of a shoe precludes excess wear in operation of the interfitting lug of an adjacent shoe.

Figure 7:
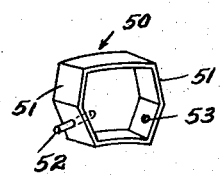
Fig. 7 is a detail of the reinforcement of the variant form shown in Fig. 6.

In the modification depicted in Figs. 6 and 7 the reinforcement is a band or shroud 50 encasing the sides of the shoe and conforming in configuration thereto. This reinforcing plate may be a continuous member as shown, or on the other hand it could be split. It provides wear-resisting sections 51 for bearing against the driving dogs, and has means incorporated in it to interfit with an adjacent shoe for synchronizing radial movements. Such means are illustrated as consisting of a pin 52 at one side of the shoe and an aperture 53 in the other side for receiving a like pin of an adjacent shoe. The pin may be press fitted in a hole in the plate to retain it in place while the shoe is cast.

The invention provides an improved shoe structure which is easy to manufacture and which is efficient in operation. It is understood that such changes and variations of the disclosure may be resorted to as come within the spirit and scope of the invention.

What I claim is:

1. The combination in a soft metal shoe for a centrifugal clutch in which shoes are arranged in series side by side and guidably driven for radial movement by dogs interposed between adjacent shoes, of a pre-formed sheet metal stamping cast on the shoe to present wear-resisting faces for engagement with adjacent dogs, and male and female elements integrally formed on said stamping to cause neighboring shoes to operate in unison.

2. A cast soft metal shoe for a centrifugal clutch in which shoes are arranged in series side by side and guidably driven for radial movement by dogs interposed between adjacent shoes, characterised in that a sheet metal stamping is moldably applied to the shoe to present a wear-resisting face to a dog and has a part to interfit with an adjacent shoe to synchronise radial movement.

3. A cast soft metal shoe for a centrifugal clutch in which shoes are arranged in series side by side and guidably driven for radial movement by dogs interposed between adjacent shoes, characterised in that a reinforcing plate is moldably applied to the shoe to present a wear-resisting face to a dog and is fashioned as a sheet metal stamping having a lug which projects outwardly from a side of the shoe for fitting in an aperture of an adjacent shoe to synchronize radial movement.

4. A cast soft metal shoe for a centrifugal clutch in which shoes are arranged in series side by side and guidably driven for radial movement by dogs interposed between adjacent shoes, characterised in that a reinforcing plate is moldably applied to the shoe to provide wear-resisting faces at the sides thereof for engagement with adjoining dogs, said plate having a rigid element at one side of the shoe projecting outwardly and spaced below the corresponding wear-resisting face for interfitting in an aperture of the neighboring shoe for synchronizing movement of adjacent shoes.

5. A cast soft metal shoe for a centrifugal clutch in which shoes are arranged in series side by side guidably driven for radial movement by dogs interposed between adjacent shoes, characterized in that reinforcing plates are moldably anchored in the shoe to present wear-resisting faces at the sides thereof for engagement with adjoining dogs, one plate having a struck-up lug for engaging in an aperture in the adjacent shoe and the other plate having an inwardly arranged U-shaped part reinforcing an aperture which receives a lug of an adjacent shoe, the lug and the aperture of the shoe effecting synchronised movement of adjacent shoes.

6. In a centrifugal clutch in which shoes are arranged in series side by side and guidably controlled for radial movement by driving elements interposed between adjacent sides of the shoes, said shoes comprising cast bodies of soft metal, wear plates moldably attached thereto at said adjacent sides for engaging the driving elements, and a projection included in one of the wear plates of adjacent sides and engaged slidably in an aperture in the adjacent side of the adjoining shoe to synchronise movement.

7. A cast soft metal shoe for a centrifugal clutch in which shoes are arranged in series side by side and guidably driven for radial movement by dogs interposed between adjacent shoes, characterized in that a sheet metal stamping is moldably applied to the shoe to provide a wear-resisting face to a dog and has a struck up part for engaging an adjacent shoe to synchronize radial movements.

8. A cast soft metal shoe for a centrifugal clutch in which shoes are arranged in series side by side and guidably driven for radial movements, characterized in that a device fashioned as a sheet metal stamping of relatively hard material is moldably anchored in the shoe and has a lug which projects outwardly of a side of the shoe for fitting in an aperture of an adjacent shoe to synchronize radial movements thereof.

NORMAN BRUCE WILSON.